May 2, 1950     A. H. HAVIR     2,506,452
CLUTCH ACTUATING MECHANISM
Filed April 26, 1948     3 Sheets-Sheet 1
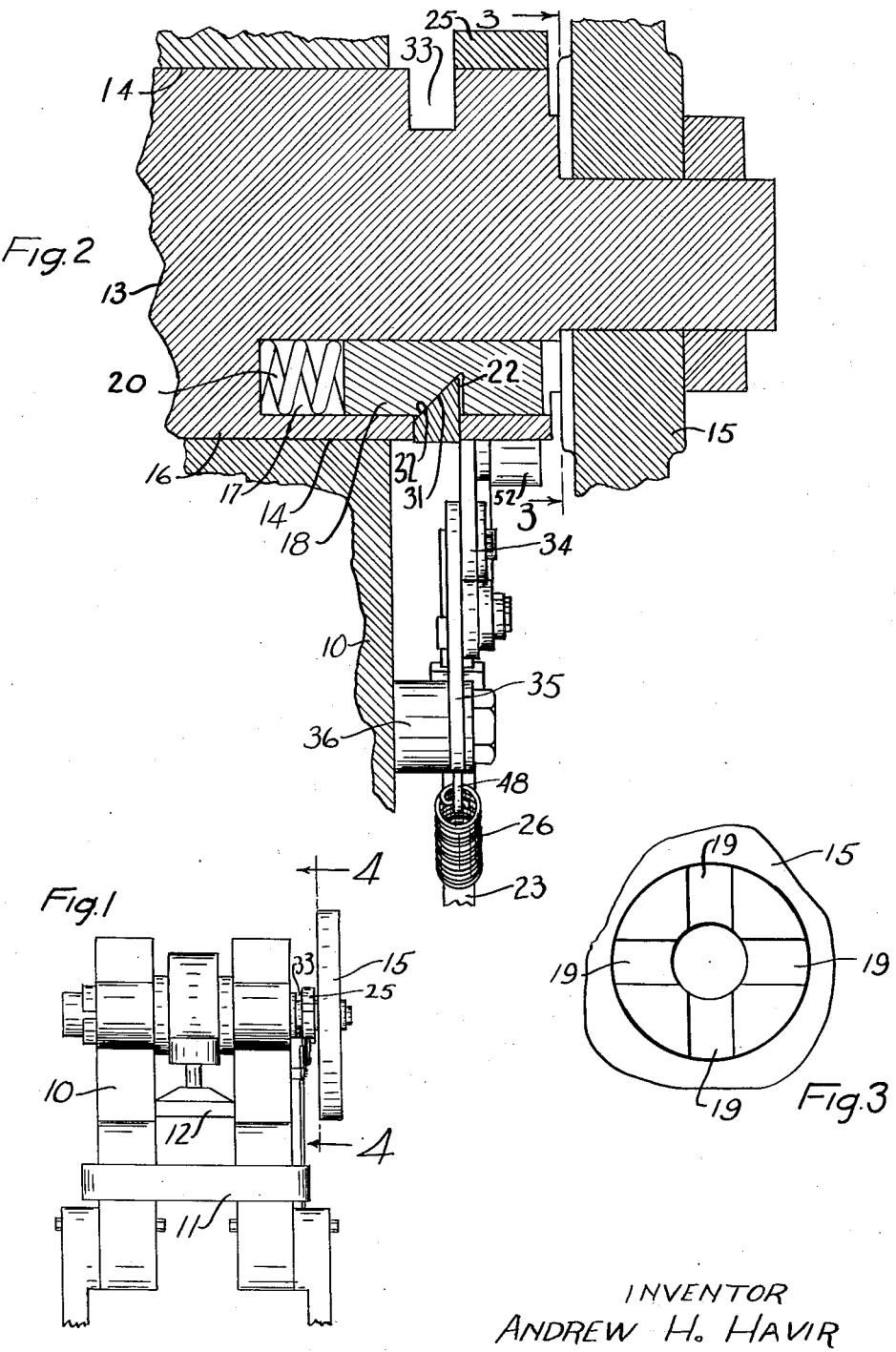
INVENTOR
ANDREW H. HAVIR
BY
G. H. Braddock
ATTORNEY May 2, 1950 A. H. HAVIR 2,506,452
CLUTCH ACTUATING MECHANISM
Filed April 26, 1948 3 Sheets-Sheet 2

INVENTOR
ANDREW H. HAVIR
BY G. H. Braddock
ATTORNEY

May 2, 1950 A. H. HAVIR 2,506,452
CLUTCH ACTUATING MECHANISM
Filed April 26, 1948 3 Sheets-Sheet 3

INVENTOR
ANDREW H. HAVIR
BY G. H. Braddock
ATTORNEY

Patented May 2, 1950

2,506,452

UNITED STATES PATENT OFFICE 2,506,452

CLUTCH ACTUATING MECHANISM

Andrew H. Havir, St. Paul, Minn.

Application April 26, 1948, Serial No. 23,350

9 Claims. (Cl. 192—25)

This invention has relation to clutch actuating mechanism which can be applied to use for many purposes but which has been devised to be especially useful when employed to clutch and unclutch a driven fly wheel or pulley and a crank shaft of a machine, such, for example, as a punch press, including a stationary lower member and a movable upper member adapted to be reciprocated relative to said stationary lower member in response to operation of said driven fly wheel or pulley and said crank shaft.

The fly wheel or pulley of a machine of character as above set forth customarily is constantly driven by power actuated means, and the movable upper member ordinarily is situated substantially at the upper limit of its upstroke when the machine is at rest. When said machine is set in motion, its power actuated fly wheel or pulley drives its crank shaft to cause its movable upper member to make a downstroke and an upstroke; said crank shaft is unclutched from said power actuated fly wheel or pulley upon approach of said movable upper member toward the upper limit of each upstroke, and a brake operates to bring the movable upper member to rest at the upper limit of each of its upstrokes. A machine now in commerce of the general type as above includes mechanism controlled by a foot pedal for causing the crank shaft to be clutched to and unclutched from the power actuated fly wheel or pulley. The crank shaft and fly wheel or pulley or clutched together in response to actuation of the foot pedal to set the machine in motion, and said crank shaft and fly wheel are caused to become unclutched, upon approach of the movable upper member toward the upper limit of each upstroke, in response to release of said foot pedal. In any instance when an operator of such a machine retains its foot pedal in position to which actuated, to commence operation of the machine for an interval longer than sufficient to perform a downstroke and upstroke of the movable upper member, the crank shaft will remain clutched to the power actuated fly wheel or pulley, by reason of the fact that unclutching is accomplished in response to release of said foot pedal, and said upper member will again descend.

An object of the present invention is to provide a new and improved mechanism for clutching together and unclutching a power actuated member, such as a fly wheel or pulley, and a member to be driven, such as a crank shaft, which will incorporate a first means adapted to be manually actuated to cause the power actuated member and the member to be driven to be clutched together and a second means adapted to be actuated in response to operation of said member to be driven to cause said power actuated member and the member to be driven to be unclutched.

A further object is to provide in a machine including a power actuated member and a member to be driven, a mechanism incorporating a new and improved construction and arrangement including a first instrumentality adapted to be manually actuated to cause the power actuated member and the member to be driven to be clutched together and a second instrumentality adapted to be actuated in response to movement through a predetermined cycle of said member to be driven to cause said power actuated member and the member to be driven to be unclutched.

A further object is to provide a new and improved mechanism for clutching together and unclutching a rotatably mounted power actuated fly wheel or pulley and a rotatably mounted crank shaft, which will incorporate a first instrumentality adapted to be manually actuated to cause the power actuated fly wheel or pulley and the crank shaft to be clutched together and a second instrumentality adapted to be actuated in response to rotation of said crank shaft through a predetermined cycle to cause said power actuated fly wheel or pulley and the crank shaft to be unclutched.

A further object is to provide in a machine including a stationary lower member, a movable upper member adapted to be situated substantially at the upper limit of its upstroke when the machine is at rest, a crank shaft assembled with said movable upper member and adapted to be operated to accomplish alternate downstroke of the movable upper member toward and away from the stationary lower member and a power actuated fly wheel or pulley adapted to be clutched to said crank shaft to cause it to be rotated and unclutched from the crank shaft upon approach of said movable upper member toward the upper limit of each of its upstrokes, a mechanism including a first instrumentality adapted to be manually actuated to cause the power actuated fly wheel or pulley to be clutched to the crank shaft while at rest with the movable upper member substantially at the upper limit of its upstroke and a second instrumentality adapted to be actuated in response to rotative movement of said crank shaft upon approach of said movable upper member toward the upper limit of each of its upstrokes to cause said power actuated fly wheel or pulley to become unclutched from said crank shaft.

And a further object is to provide a clutch actuating mechanism wherein will be incorporated desirable and improved features and characteristics of construction novel both as individual entities of the cltuch actuating mechanism and in combination with each other.

In the accompanying drawings forming a part of this specification,

Fig. 1 is a fragmentary front elevational view of a machine including a stationary lower member and a movable upper member reciprocable relative to said stationary lower member in response to operation of a crank shaft by a power actuated fly wheel or pulley adapted to be clutched to and unclutched from said crank shaft, the view also disclosing a clutch for connecting and disconnecting said power actuated fly wheel or pulley and said crank shaft and actuating mechanism for said clutch made according to the invention;

Fig. 2 is a detail sectional view, taken as on line 2—2 in Fig. 4;

Fig. 3 is a detail view of a fly wheel or pulley removed from the machine as it would appear from the position of line 3—3 in Fig. 2;

Figure 4:
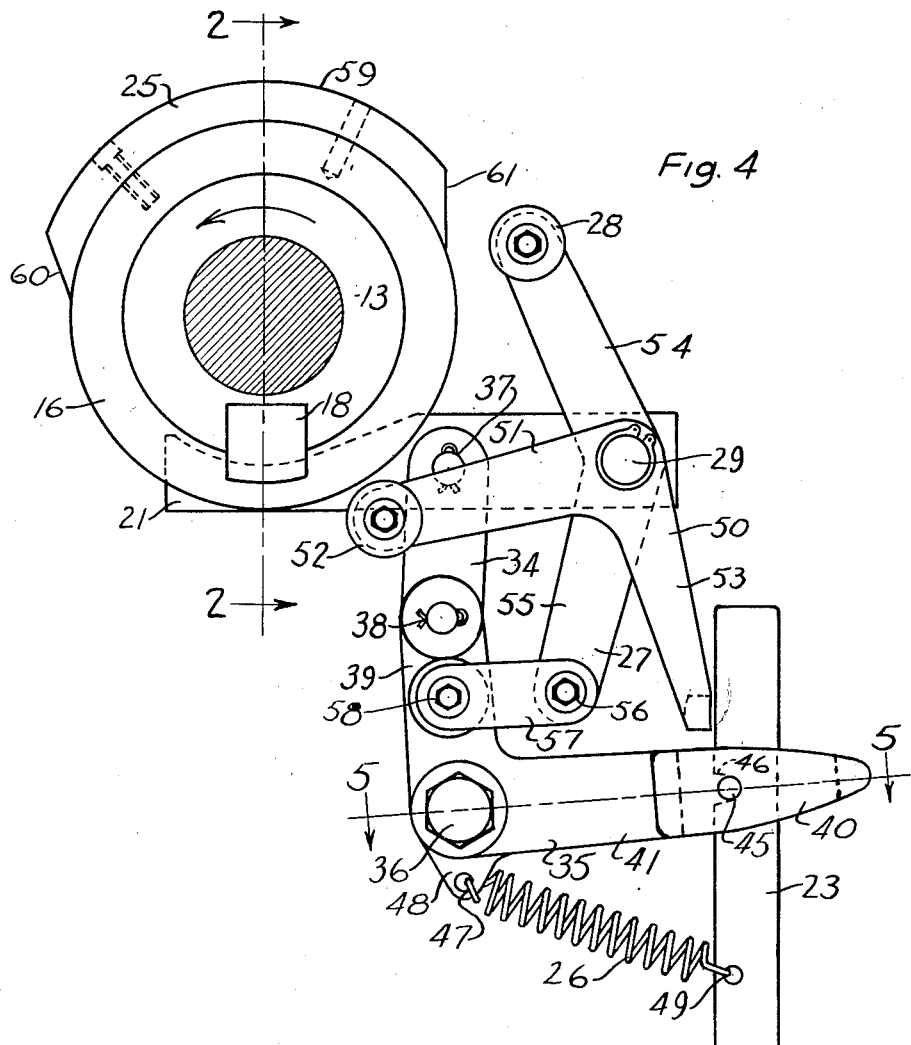
Fig. 4 is an enlarged vertical sectional view taken on line 4—4 in Fig. 1.
Figure 5:
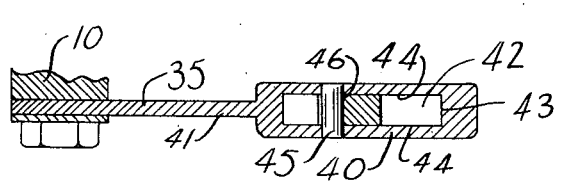
Fig. 5 is a detail sectional view, taken on line 5—5 in Fig. 4.

With respect to the drawings and the numerals of reference thereon, 10 denotes a machine including a stationary lower member 11, a movable upper member 12 adapted to be reciprocated toward and away from said stationary lower member, a crank shaft 13 suitably and conveniently mounted, as at 14, upon the frame of said machine and assembled with said movable upper member and a fly wheel or pulley 15 fixed against longitudinal movement on an end portion of said crank shaft adapted to be rotated by power actuated means (not shown) to in turn cause the crank shaft 13 to be rotated thus to cause said movable upper member to be reciprocated.

A hub 16 integral or rigid with said crank shaft 13, situated at a side of the movable upper member 12 in adjacent relation to the fly wheel or pulley 15, has a rectangular concavity 17 therein which extends longitudinally of the crank shaft and is open to the end of said hub adjacent said fly wheel or pulley, and a rectilinear clutch key 18 is snugly slidable in said rectangular concavity. Said rectilinear clutch key 18 constitutes one of complemental elements of a clutch adapted to be operated selectively to drivingly connect the fly wheel or pulley 15 to and disconnect said fly wheel or pulley from said crank shaft. The other complemental element of said clutch is constituted as radial circumferentially spaced sockets 19 in the interior surface of the fly wheel or pulley 15, adjacent the hub 16 and situated to become consecutively alined with the rectangular concavity 17. A compression coil spring 20, having one of its ends seated against the base of the concavity 17 and its other end engaged against the interior end of the clutch key 18, resiliently urges said clutch key outwardly toward the interior surface of the fly wheel or pulley 15. The sockets will be of size to be capable of snugly receiving the exterior end portion of the clutch key 18, and the construction and arrangement will be such that said outer end portion of said clutch key will fall into the socket next to become alined with the clutch key when it is urged against the interior surface of said fly wheel or pulley. It will be apparent that the fly wheel or pulley and the crank shaft will be clutched to each other when the clutch key 18 is seated in any one of the sockets 19 and will be unclutched when said clutch key is in clearing relation to the sockets.

As herein illustrated and described, the clutch actuating mechanism includes the compression coil spring 20, or equivalent element, as a part thereof and is operative to manipulate the clutch key 18 into and out of engagement with the sockets 19 thus to cause the fly wheel or pulley 15 to be connected with and disconnected from the crank shaft 13.

Speaking generally, a clutch finger 21, adjacent and in radially alined relation to the clutch key 18, is adapted to be situated in a transverse slot 22 across the exterior surface of said clutch key when the machine 10 is at rest and retain the clutch key in clearing relation to the fly wheel or pulley 15, a longitudinally reciprocable latch bar 23 operatively connected to the clutch finger 21 is adapted to be actuated, as by a foot pedal 24, to remove said clutch finger from the transverse slot 22 and release the clutch key to resilient action of the compression coil spring 20 thus to cause or permit said clutch key to be engaged in a socket 19 and cause the crank shaft to be operated by the fly wheel or pulley while power actuated and the clutch key to be rotated away from its alined relation with the clutch finger, a cam 25 on the crank shaft hub 16 is adapted to be operative while the latch bar is in actuated position and said clutch key is rotating away from said clutch finger directly after the clutch key is out of alinement with the clutch finger to break the operative connection between said latch bar and said clutch finger thus to cause the clutch finger to be released from the latch bar, a first entity constituted as a tension coil spring 26 is adapted to be operative to situate the clutch finger in the path of rotative movement of said clutch key in the circumference of its transverse slot upon release of said clutch finger from said latch bar, the clutch key is adapted to ride over the clutch finger upon approach of said clutch key toward the end of each complete revolution to cause said clutch finger to enter said transverse slot, the clutch finger while retained in the transverse slot is adapted to cause the clutch key to be actuated to unclutched position against resilient action of the compression coil spring 20 in response to rotative movement ahead of said clutch key from the radial position in which situated when the clutch finger commences entry into the transverse slot and to retain the clutch key in clearing relation to the fly wheel or pulley upon completion of each revolution of the crank shaft and said clutch key, the clutch actuating mechanism incorporates a second entity, including a rotatably mounted lever 27 operatively connected to the clutch finger 21 and actuable by the cam 25 through the medium of a roller 28 on said lever, adapted to be operative to cause the clutch key 18 to be positively withdrawn from engaged relation to the fly wheel or pulley 15 upon approach of said clutch key toward the end of each of its revolutions should the tension coil spring 26 become broken, and said tension coil spring 26 also is adapted to be operative to cause the latch bar 23 again to become operatively connected to said clutch finger upon return of said latch bar to its initial, unactuated position, as by a usual lifting spring (not shown) for forcing the foot pedal 24 upwardly when released.

The clutch finger 21 is disposed perpendicularly of the crank shaft 13 and rotatably mounted on a pivot pin 29, suitably and conveniently supported on the frame of the machine 10 at a side of and in spaced relation to the crank shaft 13, for swinging movement in a vertical plane. A free end portion 30 of said clutch finger includes an upwardly facing beveled surface 31 at the interior of its upper side adapted to be engaged against a beveled surface 32 bounding the interior side of the transverse slot 22 and extending outwardly of said crank shaft and interiorly of said machine. The crank shaft hub 16 includes a circumferential slot 33 substantially alined with the transverse slot 22 and the portion of the clutch finger 21 having the beveled surface 31 for freely receiving and affording passage for said mentioned portion of said clutch finger during rotation of the crank shaft.

An operative connection between the clutch finger 21 and the latch bar 23 includes a first link 34 and a first bell crank lever 35 having its intermediate portion rotatably mounted on a pivot pin 36 on the machine situated below and in spaced relation to said clutch finger and interiorly of and in spaced relation to said latch bar. The upper end of the first link 34 is pivotally connected, as at 37, to an intermediate portion of the clutch finger between its pivotal support 29 and its free end portion 30 and the lower end of said first link is pivotally connected, as at 38, to the upper end of an upwardly extending arm 39 of the first bell crank lever 35. An outer end portion 40 of an exteriorly extending arm 41 of said first bell crank lever includes a vertically disposed, elongated, longitudinally extending guide slot 42 which snugly receives the latch bar 23 in such manner that said latch bar can have universal sliding movement relative to said exteriorly extending arm 41. The guide slot 42 is bounded at its outer end by a transversely extending surface 43 provided by the outer end portion 40, at its opposite sides by spaced apart, parallel, longitudinally extending surfaces 44, 44 provided by said outer end portion, and at its inner end by a transversely extending latching pin 45 supported between the surfaces 44, 44. The latch bar 23 includes a latching notch 46 at its inner side with which the latching pin 45 is adapted to be releasably assembled.

One end of the tension coil spring 26 is connected, as at 47, to an extension piece 48 upon and projecting downwardly from the first bell crank lever 35 directly below the pivot pin 36 and in alined relation to the upwardly extending arm 39; the other end of said tension coil spring is connected, as at 49, to a part of the latch bar 23 disposed below the latching notch 46, and the tension coil spring extends downwardly and exteriorly.

A second bell crank lever 50, rotatably mounted on the pivot pin 29 and adapted to be actuated by the cam 25 to cause the latching pin 45 and the latching notch 46 to become disassembled, includes an interiorly extending arm 51 supporting a roller 52 at its inner end situated adjacent the free end portion 30 of the clutch finger 21 in alined relation to the cam 25 in direction transversely of the crank shaft 13 and adapted to be forced outwardly by said cam to cause a downwardly extending arm 53 of said second bell crank lever, situated interiorly of and in adjacent relation to an upper portion of the latch bar, to be swung exteriorly against said latch bar thus to cause said pin 45 and notch 46 to become disassembled.

The rotatably mounted lever 27, actuable by the cam 25 to cause the clutch key 18 to be positively withdrawn from the fly wheel or pulley 15, has its intermediate portion supported on the pivot pin 29 and includes an upwardly and interiorly extending arm 54 upon the free end of which the roller 28 is supported. Said roller 28 is situated above and in spaced relation to the clutch finger 21 to be sometimes in and sometimes adjacent the path of movement of said cam 25. The lower end of a downwardly and interiorly extending arm 55 of the lever 27 is pivotally connected, as at 56, to the outer end of an interiorly extending second link 57 having its inner end pivotally connected, as at 58, to an intermediate part of the upwardly extending arm 39 of the bell crank lever 35.

The cam 25 includes an exterior arcuate surface 59 extending circumferentially of the hub 16 and forward and rearward oblique surfaces, denoted 60 and 61, respectively, the former extending outwardly from about the periphery of the hub to the forward end of the arcuate surface 59 and the latter extending inwardly from the rearward end of said arcuate surface 59 to about the periphery of said hub. The arcuate surface 59 can be continuous throughout any preferred arc, but desirably, said arcuate surface can be continuous throughout an arc about as disclosed in Figs. 4 and 6 of the drawings.

Figures 6, 7:
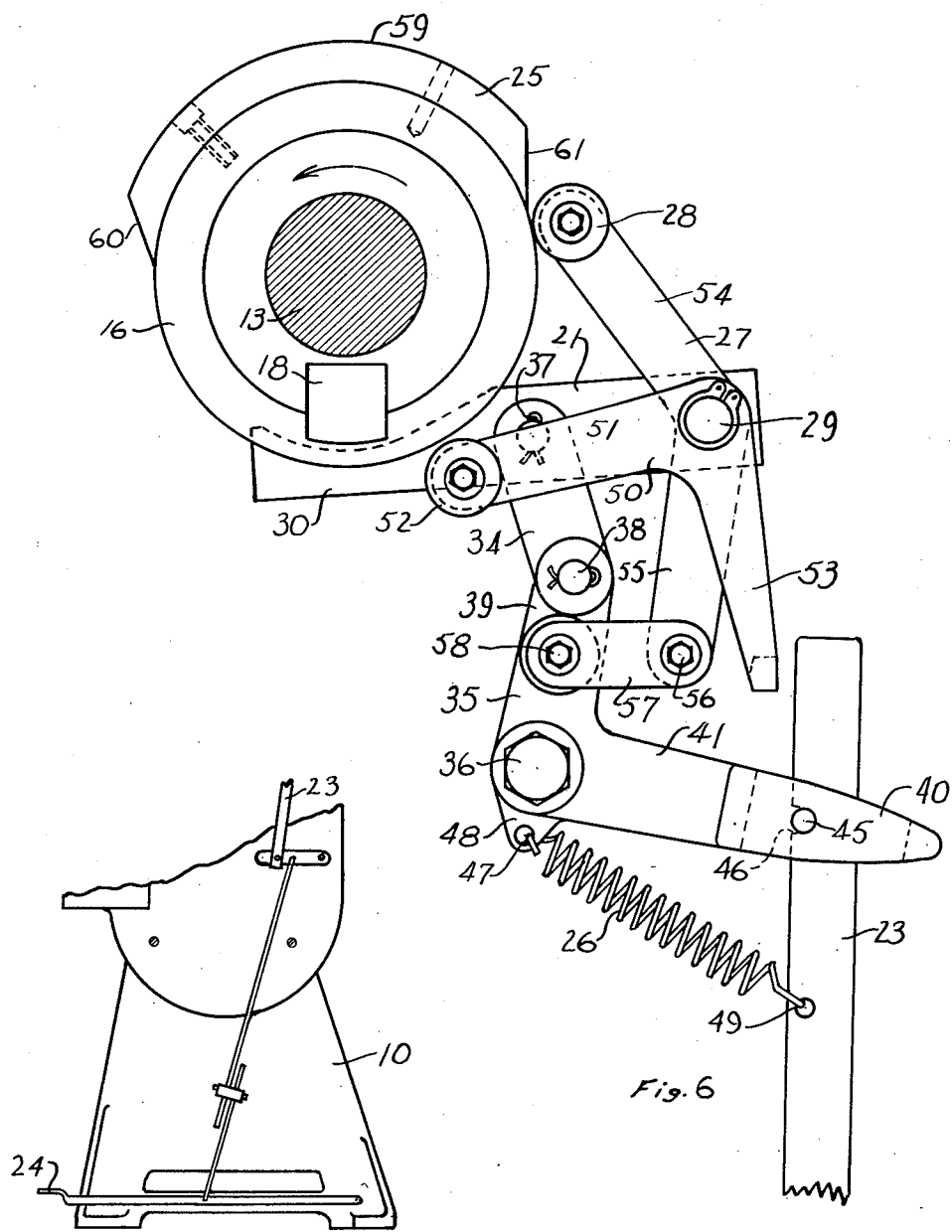
Fig. 6 is a view corresponding generally with the disclosure of Fig. 4 but showing parts of the clutch actuating mechanism in different positions.
Fig. 7 is a fragmentary end elevational view, with parts removed, disclosing a lower part of the machine shown in Fig. 1 and the lower portion of said machine omitted from said Fig. 1.

The machine 10 is disclosed in Fig. 1 of the drawings as when at rest, the movable upper member 12 being substantially at the upper limit of its upstroke and the crank shaft 13 being in position to start a downstroke of said movable member. In Fig. 4 the operative parts of the clutch actuating mechanism are in position as when said crank shaft is at rest, as in said Fig. 1, the cam 25 being at the side of the crank shaft opposite the clutch finger 21 clear of the rollers 28 and 52, the clutch key 18 being in adjacent, radially alined relation to said clutch finger 21 and the upper part of the free end portion 30 of the clutch finger being situated in the transverse slot 22. In Fig. 6 the latch bar 23 has been depressed and said free end portion 30 of the clutch finger has been withdrawn from said transverse slot 22 to cause or permit the compression coil spring 20 to clutch together the fly wheel or pulley 15 and the crank shaft 13. Stated otherwise, in said Fig. 6 the crank shaft 13 with appurtenances is disclosed as when starting to rotate after being clutched to the fly wheel or pulley 15 in response to actuation of the latch bar 23.

The first bell crank lever 35 is caused to be rotated in clockwise direction on its pivotal support 36 in response to depression of the latch bar 23 with the latching pin 45 and the latching notch 46 assembled to cause the upwardly extending arm 39 of said first bell crank lever to be rotated in downward and outward direction and the first link 34 to be swung downwardly and outwardly, thus to cause the clutch finger 21 to be swung downwardly to position where clear of the transverse slot 22.

Upon commencement of each downstroke of the movable member 12 in response to rotation of the crank shaft 13, in the direction of the arrows in Figs. 4 and 6, by power actuated means (not shown) applied to said crank shaft through the medium of the fly wheel or pulley 15, the clutch key 18 will be rotated away from its alined relation with the clutch finger 21, and with continued rotation of the crank shaft and while said clutch key is rotating away from said clutch finger after the clutch key is out of alinement with the clutch finger, the forward portion of the cam 25 will engage the roller 52 and force it downwardly to cause the second bell crank lever 50 to disassemble the latching pin 45 and the latching notch 46 in the manner as aforesaid.

The tension coil spring 26 will act immediately upon release of the first bell crank lever 35 from the latching bar 23 to rotate said first bell crank lever in counter-clockwise direction to cause the upwardly extending arm 39 and the first link 34 to be swung interiorly, from their unalined positions as in Fig. 6 to their substantially alined positions as in Fig. 4, thus to cause the free end portion 30 of the clutch finger 21 to become situated and remain in the circumferential slot 30 in the path of travel of the transverse slot 22. The construction and arrangement desirably can be such that the cam 25 will ride clear of the roller 52 to release the second bell crank lever 50 when the crank shaft completes a bit less than one half of a revolution.

The clutch key 18 will ride over the clutch finger 21 upon approach of said clutch key toward said clutch finger just before the completion of each revolution of the clutch key to cause the clutch finger to enter the transverse slot 22, and the construction and arrangement will be such that said clutch finger, while retained in said transverse slot, will cause said clutch key to be withdrawn from the fly wheel or pulley 15, against resilient action of the compression coil spring 20, in response to sliding movement of the beveled surface 32 along and over the beveled surface 31.

The tension coil spring 26 constantly will urge the latch bar 23 upwardly and inwardly against the latching pin 45, and upon release of said latch bar after each of its actuations said tension coil spring will, in cooperation with a usual latch bar lifting spring, cause the latch bar to be elevated and its notch 46 and the latching pin 45 to become assembled upon elevation of said latch bar to its initial, unactuated position.

The roller 28 is situated forwardly or in advance of the roller 52 and the forward end portion of the cam 25 reaches the location of said roller 28 during each revolution of the crank shaft 13 after said forward end portion passes said roller 52 and while the first bell crank lever 35 and the latch bar 23 are disconnected. In the event the tension coil spring 26 remains intact, the roller 28 will be retained at its outermost position to perform no useful function. The tension coil spring if operative will have actuated the first bell crank lever 35 to its counter clockwise rotated position to cause the clutch finger 21 to be situated and held in the circumferential slot 33 and the roller 28 to be rotated to and retained at its outermost position, through the medium of the upwardly extending arm 39 of said first bell crank lever and the second link 57, before the interval of each rotation of the crank shaft 13 during which cam 25 is passing said roller. If, however, the tension coil spring 26 should become broken or otherwise incapacitated and fail to actuate the first bell crank lever 35 to cause the clutch finger 21 to be situated and retained in said circumferential slot 33 in position to enter the transverse slot 22 with rotation of the crank shaft 13 toward the completion of any of its revolutions, said cam 25 upon passage beyond the roller 52 will engage the roller 28 and force it outwardly to rotate the lever 27 in clockwise direction and cause the downwardly and interiorly extending arm 55 to be swung interiorly thus to cause the second link 57 to be moved interiorly, the upwardly extending arm 39 and the first link 34 to be swung interiorly to position where substantially in alined relation and said clutch finger to be forced into and retained in the circumferential slot. In the disclosure as made, the cam 25 will ride clear of said roller 28 to release the rotatably mounted lever 27 a trifle before the crank shaft 13 comes to rest upon completion of each of its revolutions.

Of course, a brake, forming no part of the invention, will bring the crank shaft 13 to rest upon its release from the fly wheel or pulley 15.

What is claimed is:

1. In a machine including a member to be power actuated and a member to be driven, a first means adapted to be manually actuated to cause said members to be clutched together, a second means adapted to be actuated in response to operation of said member to be driven to cause the members to be unclutched, and a third means adapted to be actuated in response to operation of said member to be driven for causing said members to be unclutched in the event said second means becomes incapacitated.

2. In a machine including a member to be power actuated and a member to be driven, a first instrumentality adapted to be manually actuated to cause said members to be clutched together, a second instrumentality adapted to be actuated in response to movement of said member to be driven to cause the members to be unclutched, means including a spring for actuating said second instrumentality, and a third instrumentality adapted to be actuated in response to operation of said member to be driven for causing said members to be unclutched in the event said spring becomes incapacitated and said means fails to actuate said second instrumentality.

3. In a machine including a member to be power actuated and a member to be driven, a first instrumentality adapted to be manually actuated to cause said members to be clutched together, a second instrumentality adapted to be actuated in response to movement through a predetermined cycle of said member to be driven to cause the members to be unclutched, means including a tension coil spring for actuating said second instrumentality, and a third instrumentality adapted to be actuated in response to operation of said member to be driven for causing said members to be unclutched in the event said tension coil spring becomes incapacitated and said means fails to actuate said second instrumentality.

4. In a machine of the character described, a rotatably mounted member to be power actuated, a rotatably mounted member to be driven, clutching means for causing said members to be connected and disconnected including a first clutch element upon and rotatable with said member to be driven and adapted to be engaged with and disengaged from a second clutch element upon said member to be power actuated, resilient means for actuating said first clutch element into engagement with said second clutch element, a clutch finger for retaining the first clutch element disengaged from the second clutch element when said machine is at rest adapted to be actuated to release said first clutch element to action of said resilient means thus to cause the first clutch element to become engaged with said second clutch element and said member to be driven together with said first clutch element to be rotated by said power actuated member, a manually actuable latch member for actuating said clutch finger to cause it to release said first clutch element, an operative connection between the clutch finger and said latch member releasably connected to the latch member, first means adapted to be operative in response to rotation of the member to be driven to release said operative connection from said latch member while the latch member is in actuated position and when said first clutch element has rotated to position where clear of the clutch finger, and second means adapted to be operative to situate and retain said clutch finger in the path of rotative movement of said first clutch element upon release of said operative connection from said latch member, said clutch finger while retained in the path of rotative movement of said first clutch element being adapted to cause the first clutch element to be disengaged from and retained in disengaged relation to the second clutch element against action of said resilient means in response to rotative movement of said member to be driven.

5. In a machine of the character described, a rotatably mounted member to be power actuated, a rotatably mounted member to be driven, clutching means for causing said members to be connected and disconnected including a first clutch element upon and rotatable with said member to be driven and adapted to be engaged with and disengaged from a second clutch element upon said member to be power actuated, resilient means for actuating said first clutch element into engagement with said second clutch element, a clutch finger for retaining the first clutch element disengaged from the second clutch element when said machine is at rest adapted to be actuated to release said first clutch element to action of said resilient means thus to cause the first clutch element to become engaged with said second clutch element and said member to be driven together with said first clutch element to be rotated by said power actuated member, a manually actuable latch member for actuating said clutch finger to cause it to release said first clutch element, an operative connection between the clutch finger and said latch member including a first rotatable lever releasably connected to the latch member, means including a cam movable with said member to be driven and a second rotatable lever adapted to be operative in response to rotative movement of said cam to release said first rotatable lever from said latch member while the latch member is in actuated position and when said first clutch element has rotated to position where clear of the clutch finger, and a tension spring adapted to be operative upon said first rotatable lever to situate and retain said clutch finger in the path of rotative movement of said first clutch element upon release of the first rotatable lever from said latch member, said clutch finger while retained in the path of rotative movement of said first clutch element being adapted to cause the first clutch element to be disengaged from and retained in disengaged relation to the second clutch element against action of said resilient means in response to rotative movement of said member to be driven.

6. The combination as specified in claim 5, and means adapted to be operated by said cam to situate and retain said clutch finger in the path of rotative movement of the first clutch element after release of said first rotatable lever from the latch member in the event said tension spring should become incapacitated.

7. In a machine of the character described, a rotatably mounted member to be power actuated, a rotatably mounted member to be driven, clutching means for causing said members to be connected and disconnected including a first clutch element rotatable with said member to be driven and adapted to be engaged with and disengaged from a second clutch element upon said member to be power actuated, means for actuating said first clutch element into engagement with said second clutch element, a clutch finger for retaining the first clutch element disengaged from the second clutch element when said machine is at rest adapted to be actuated to release said first clutch element to action of said means thus to cause the first clutch element to become engaged with said second clutch element and said member to be driven together with said first clutch element to be rotated by said power actuated member, a manually actuable latch member for actuating said clutch finger to cause it to release said first clutch element, an operative connection between the clutch finger and said latch member releasably connected to the latch member, first means adapted to be operative to release said operative connection from said latch member, and second means adapted to be operative to situate and retain said clutch finger in the path of rotative movement of said first clutch element upon release of said operative connection from said latch member.

8. The combination as specified in claim 7 wherein said operative connection includes a first rotatable lever and said first means includes a cam movable with said member to be driven and a second rotatable lever adapted to be operative in response to movement of said cam.

9. In a machine of the character described, a rotatably mounted member to be power actuated, a rotatably mounted member to be driven, clutching means for causing said members to be connected and disconnected including a first clutch element rotatable with said member to be driven and adapted to be engaged with and disengaged from a second clutch element upon said member to be power actuated, means for actuating said first clutch element into engagement with said second clutch element, a clutch finger for retaining the first clutch element disengaged from the second clutch element when said machine is at rest adapted to be actuated to release said first clutch element to action of said means thus to cause the first clutch element to become engaged with said second clutch element and said member to be driven together with said first clutch element to be rotated by said power actuated member, a manually actuated latch member for actuating said clutch finger to cause it to release said first clutch element, an operative connection between the clutch finger and said latch member releasably connected to the latch member, first means adapted to be operative to release said operative connection from said latch member, second means adapted to be operative to situate and retain said clutch finger in the path of rotative movement of said first clutch element, and third means adapted to be operative to situate said clutch finger in the path of rotative movement of the first clutch element after release of said operative connection from said latch member in the event said second means should become incapacitated.

ANDREW H. HAVIR.

REFERENCES CITED

The following references are of record in the file of this patent:

UNITED STATES PATENTS

| Number | Name | Date |
|---|---|---|
| 1,710,705 | Loshbough | Apr. 30, 1929 |
| 2,306,167 | Johnson | Dec. 22, 1942 |